(12) United States Patent
Garmer

(10) Patent No.: US 7,110,726 B1
(45) Date of Patent: Sep. 19, 2006

(54) RF ASIC FOR SUBSCRIBER COMMUNICATOR

(75) Inventor: William Richard Garmer, San Diego, CA (US)

(73) Assignees: Quake Global, Inc., San Diego, CA (US); MobiApps, Inc., Arlington, VA (US)

( * ) Notice: Subject to any disclaimer, the term of this patent is extended or adjusted under 35 U.S.C. 154(b) by 366 days.

(21) Appl. No.: 10/443,537

(22) Filed: May 22, 2003

(51) Int. Cl.
*H04B 1/40* (2006.01)

(52) U.S. Cl. ............... 455/88; 455/183.1; 455/83; 455/86; 455/234.1; 455/118; 375/279; 375/316; 375/345; 709/230; 709/231; 709/237

(58) Field of Classification Search ............... 455/118, 455/83, 86, 88, 183.1, 73, 234.1; 375/316, 375/279, 345; 709/230, 231, 237
See application file for complete search history.

(56) References Cited

U.S. PATENT DOCUMENTS

| | | | | |
|---|---|---|---|---|
| 5,920,593 A | * | 7/1999 | Perl et al. | 375/222 |
| 6,141,387 A | * | 10/2000 | Zhang | 375/261 |
| 6,449,317 B1 | * | 9/2002 | Critchlow et al. | 375/308 |
| 6,587,516 B1 | * | 7/2003 | Critchlow et al. | 375/308 |
| 6,658,237 B1 | * | 12/2003 | Rozenblit et al. | 455/83 |
| 6,728,326 B1 | * | 4/2004 | Fulghum | 375/365 |
| 6,799,023 B1 | * | 9/2004 | Pinola et al. | 455/234.1 |
| 6,882,861 B1 | * | 4/2005 | Panasik et al. | 455/553.1 |

* cited by examiner

*Primary Examiner*—Marceau Milord
(74) *Attorney, Agent, or Firm*—Smith, Gambrell & Russell, LLP

(57) ABSTRACT

An RF ASIC for a subscriber communicator includes a receiver section, a transmitter section, a CODEC and an I²S port. The receiver section downconverts by superheterodyning and demodulates a received RF communication signal to provide analog quadrature components of the received signal at baseband. The transmitter section upconverts and combines analog input quadrature modulation components to provide an RF communication transmit signal and then amplifies the transmit signal for driving an external power amplifier. The CODEC processes the analog baseband quadrature components of the received signal to provide I and Q digital output signals, and processes I and Q digital input signals to provide the analog input quadrature modulation components for said upconversion. The I²S port combines the I and Q digital output signals for output as a serial digital signal stream, and separates the I and Q digital input signals from an input serial digital signal stream.

22 Claims, 3 Drawing Sheets

RF ASIC FOR SUBSCRIBER COMMUNICATOR

BACKGROUND OF THE INVENTION

The present invention generally pertains to a subscriber communicator for use in satellite communications and is particularly directed to an improved implementation of the receiver and transmitter channels of a subscriber communicator in an ASIC (application specific integrated circuit).

In a subscriber communicator, the receiver channel downconverts and demodulates a received RF (radio frequency) communication signal to provide received quadrature components at baseband and processes the quadrature components to respectively provide I and Q digital data output signals; and the transmitter channel processes I and Q digital data input signals to provide input quadrature modulation components; and upconverts and combines the quadrature modulation components to provide an RF communication transmit signal.

A known RF ASIC for a subscriber communicator comprises a receiver section that includes means for receiving an RF communication signal and means for directly downconverting and demodulating the received RF communication signal to provide analog quadrature components of the received signal at baseband; a transmitter section that includes means for upconverting and combining analog input quadrature modulation components to provide an RF communication transmit signal and means for amplifying the transmit signal for driving an external power amplifier; and a synthesizer for providing signals at selected frequencies for use in said downconversion and upconversion.

SUMMARY OF THE INVENTION

The present invention provides an RF ASIC for a subscriber communicator, comprising: a receiver section, including; means for receiving an RF communication signal; and means for downconverting and demodulating the received RF communication signal to provide analog quadrature components of the received signal at baseband; a transmitter section, including: means for upconverting and combining analog input quadrature modulation components to provide an RF communication transmit signal; and means for amplifying the transmit signal for driving an external power amplifier; and a CODEC for processing the analog baseband quadrature components of the received signal to provide I and Q digital output signals, and for processing I and Q digital input signals to provide the analog input quadrature modulation components for said upconversion. Preferably, this RF ASIC further includes a single port for combining the I and Q digital output signals for output as a serial digital signal stream, and for separating the I and Q digital input signals from an input serial digital signal stream.

In another aspect, the present invention provides an RF ASIC for a subscriber communicator for use in satellite communications, comprising: a receiver channel, including: means for downconverting and demodulating a received RF satellite communication signal to provide received quadrature components at baseband; and means for processing the quadrature components of the received signal to respectively provide I and Q digital output signals; and a transmitter channel, including: means for processing I and Q digital input signals to provide input quadrature modulation components; and means for upconverting and combining the input quadrature modulation components to provide an RF communication transmit signal.

Additional features of the present invention are described with reference to the detailed description of the preferred embodiments.

DETAILED DESCRIPTION

The preferred embodiment of the RF ASIC according to the present invention is adapted for inclusion in a subscriber communicator that is adapted for use in the ORBCOMM Satellite communication network. The ORBCOMM network includes twenty-eight low-earth-orbit (LEO) communication satellites, gateway Earth stations, network control centers and a global network operations center in Dulles, Va. The ORBCOMM network provides wireless, two-way global satellite data communications between mobile subscriber communicators and operators via the Internet or dedicated leased lines for high-volume operations. ORBCOMM downlink signals are provided in a symmetrical differential phase-shift-keyed (SDPSK) format at 4800 bps in receive frequency range between 137.0 and 138.0 MHz. ORBCOMM uplink signals are provided in a SDPSK format at 4800 bps in transmit frequency range between 148.0.0 and 150.05 MHz.

Figure 1:
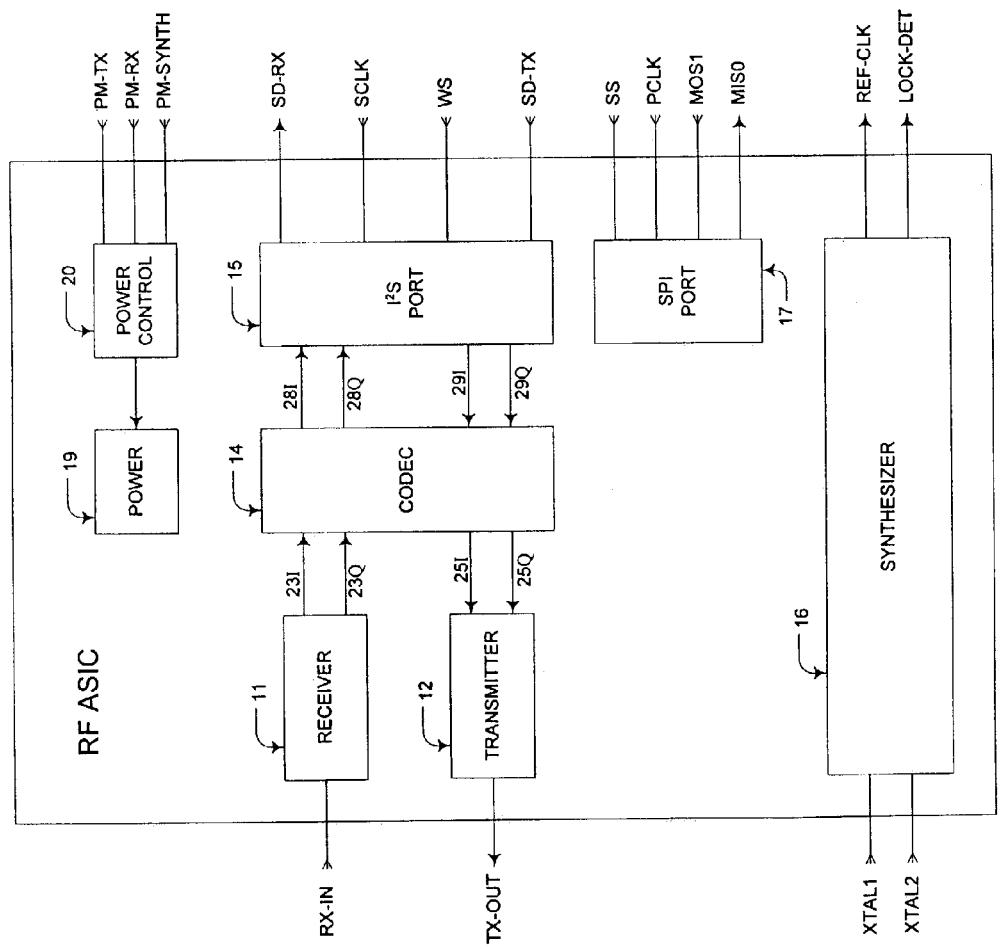
FIG. 1 is a block diagram of a preferred embodiment of the RF ASIC of the present invention.

Referring to FIG. 1, a preferred embodiment of an RF ASIC 10 according to the present invention includes a receiver section 11, a transmitter section 12, a stereo CODEC 14, an inter-IC sound ($I^2S$) port 15, a synthesizer 16, a serial peripheral interface (SPI) port 17, a power section 19 and a power control section 20. The receiver section 11 and a transmitter section 12 operate in a half-duplex mode.

The receiver section 11 receives an RF communication signal RX-IN from an external receive/transmit antenna via an external RX/TX switch and an external bandpass filter; and downconverts and demodulates the received RF communication signal 22 to provide analog quadrature components 23I, 23Q of the received signal at baseband.

The transmitter section 12 upconverts and combines analog input quadrature modulation components 25I, 25Q to provide an RF communication transmit signal, and amplifies the transmit signal to provide an output transmit signal TX-OUT for driving an external power amplifier that is coupled to the antenna via an external low-pass filter and the external RX/TX switch.

The various components referred to throughout this description as being "external" typically are included in the subscriber communicator that includes the RF ASIC of the present invention.

The CODEC 14 processes the analog baseband quadrature components 23I, 23Q of the received signal to provide I and Q digital output signals 28I, 28Q, and also processes I and Q digital input signals 29I, 29Q to provide the analog input quadrature modulation components 25I, 25Q that are upconverted by the transmitter section 12.

The I²S port 15 combines the I and Q digital output signals 28I, 28Q for output as a serial digital signal stream SD-RX, and separates the I and Q digital input signals 29I, 29Q from an input serial digital signal stream SD-TX.

The synthesizer 16 provides signals at selected frequencies for use in the signal downconversion provided by the receiver section 11 and in the signal upconversion provided by the transmitter section 12. The SPI port 17 is coupled to the synthesizer 16 for programming the synthesizer 16 to synthesize signals at the selected frequencies.

The power section 19 distributes power to the receiver section 11, the transmitter section 12, the CODEC 14 and the synthesizer 16. Preferably the power is supplied by a replaceable battery received by the power section 19. The power control section 20 controls the power distribution to the receiver section 11 in accordance with an externally provided PM-RX control signal; controls the power distribution to the transmitter section 12 in accordance with an externally provided PM-TX control signal; and controls the power distribution to the receiver section 16 in accordance with an externally provided PM-SYNTH control signal.

The ASIC 10 is connected to an external digital signal processor (DSP) within the signal communicator. The DSP provides the PM-RX control signal, the PM-TX control signal and the PM-SYNTH control signal to the power control section 20.

The DSP is also connected to the I²S port 15 for receiving the output serial digital signal stream SD-RX from the I²S port 15 and for providing the input serial digital signal stream SD-TX to the I²S port 15 in accordance with a word strobe signal WS and a serial clock signal SCK that are also provided by DSP is to the I²S port 15.

The DSP is connected to the synthesizer 16 via the SPI port 17 for providing a synthesizer programming data signal MOSI in accordance with a strobe signal SS and a programming clock signal PCLK that are also provided by the DSP to the SPI port 17. A confirming data-back signal MISO is provided by the SPI port 17 to the DSP.

The synthesizer 16 receives timing signals XTAL1 and XTAL2 from external quartz crystals and provides a reference clock signal REF-CLK to the DSP. The synthesizer 16 also provides a lock detect signal LOCK DET to the DSP when the synthesizer becomes locked to a frequency indicated by the synthesizer programming data signal MOSI.

Figure 2:
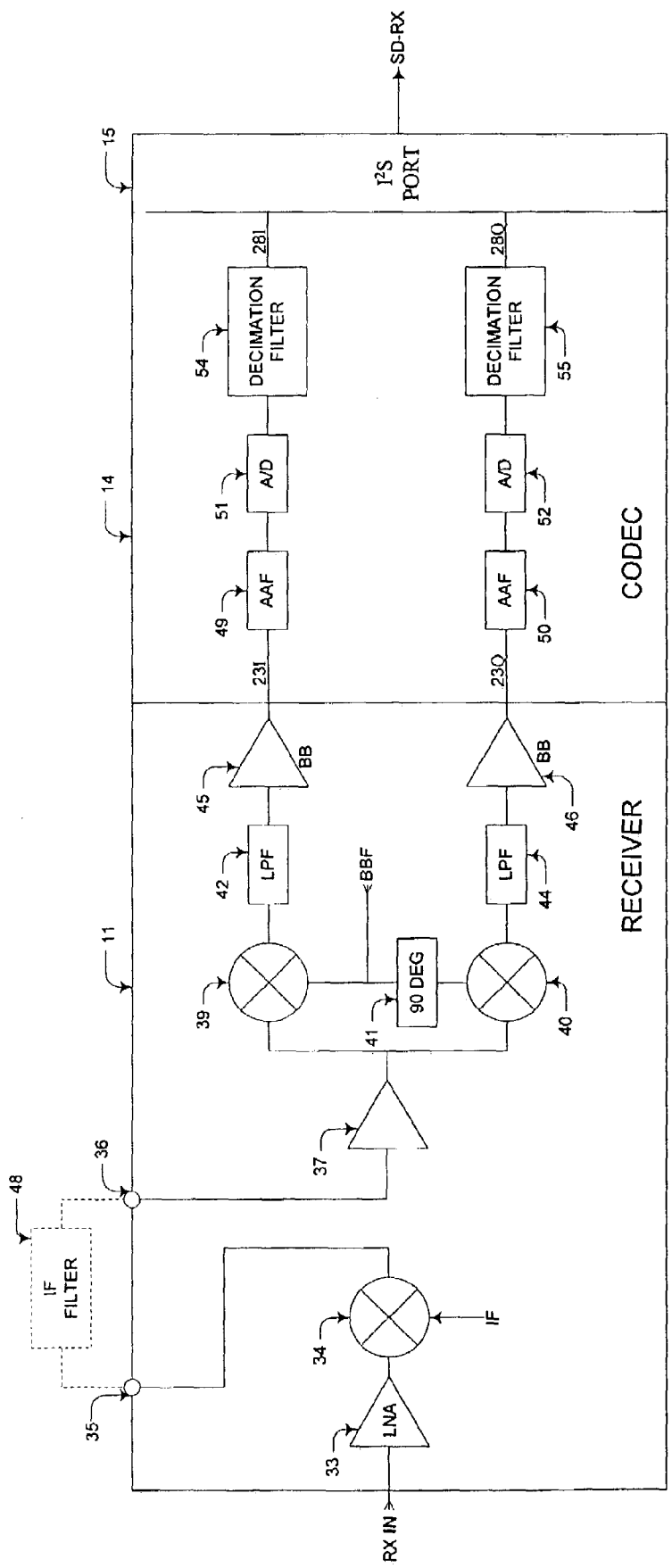
FIG. 2 is a block diagram of a preferred embodiment of a receiver channel implemented in the receiver section and the CODEC of the RF ASIC of FIG. 1.

Referring to FIG. 2, a preferred embodiment of the receiver channel of the subscriber communicator is implemented in the receiver section 11 and the CODEC 14 of the ASIC 10 of FIG. 1. The receiver section 11 includes a low-noise amplifier (LNA) 33, a first mixer 34, a first port 35, a second port 36, a digital-controlled variable gain amplifier 37, an I-channel mixer 39, a Q-channel mixer 40, a 90-degree phase shifter, 41, an I-channel low-pass filter (LPF) 42, Q-channel low-pass filter 44 an I-channel baseband amplifier (BBA) 45 and a Q-channel baseband amplifier 46.

A local oscillator signal at an intermediate frequency IF is provided to the first mixer 34 by the synthesizer 16. Local oscillator signals at the baseband frequency BBF are provided to each of the I-channel mixer 39 and the Q-channel mixer 40 by the synthesizer 16.

The receiver section 11 thereby provides a superhetrodyne receiver for downconverting the received signal; wherein the received signal is first downconverted by the first mixer 34 to the intermediate frequency IF and, after being fed from the first port 35 through an external narrow-band IF filter 48 and back onto the ASIC 10 via the second port, 36, is then downconverted from the intermediate frequency by the I-channel mixer 39 and a Q-channel mixer 40, filtered by the respective I and Q-channel low-pass filters 42, 44 and amplified by the respective I and Q-channel bandpass amplifiers 45, 46 to provide the analog quadrature components 23I, 23Q of the received signal at baseband. The external IF filter 48 is a ceramic filter. Such an external IF filter is preferred because it is more economical than if the IF filter were to be implemented in the ASIC 10.

In an alternative embodiment (not shown) downconversion to baseband is direct.

The CODEC 14 includes an I-channel anti-alias low-pass filter (AAF) 49, a Q-channel anti-alias low-pass filter 50, an I-channel analog-to-digital converter (A/D) 51, a Q-channel analog-to-digital converter 52, an I-channel digital decimation filter 54 and a Q-channel digital decimation filter 55. Preferably, the I and Q-channel analog-to-digital converters 51, 52 are switched-capacitor and sigma-delta-modulated.

The analog baseband quadrature components 23I, 23Q of the received signal are processed by the respective I and Q-channel low-pass filters 49, 50, analog-to-digital converters 51, 52 and decimation filters 54, 55 to provide the I and Q digital output signals 28I, 28Q to the I²S port 15.

Figure 3:
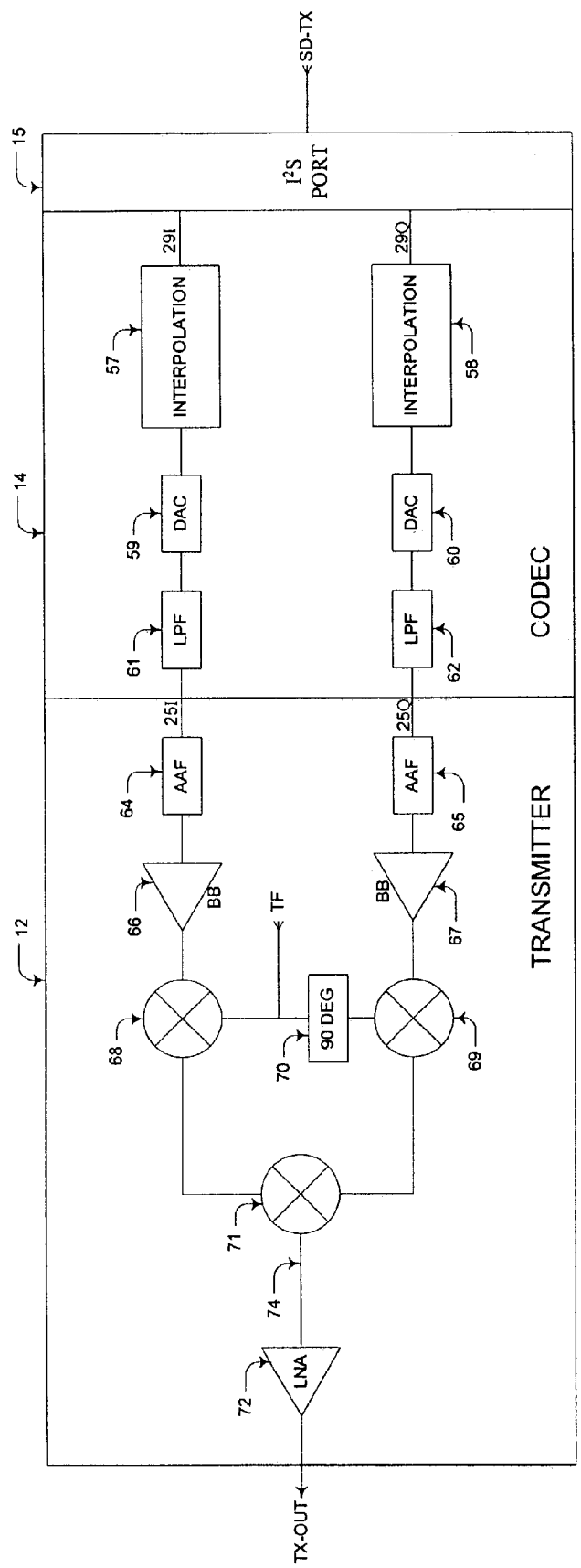
FIG. 3 is a block diagram of a preferred embodiment of a transmitter channel implemented in the transmitter section and the CODEC of the RF ASIC of FIG. 1.

Referring to FIG. 3, a preferred embodiment of the transmitter channel of the subscriber communicator is implemented in the transmitter section 12 and the CODEC 14 of the ASIC 10 of FIG. 1. The CODEC 14 includes an I-channel interpolation filter 57, a Q-channel interpolation filter 58, an I-channel digital-to-analog converter (DAC) 59, a Q-channel DAC 60, an I-channel low-pass filter 61 and a Q-channel low-pass filter 62. Preferably, the I and Q-channel DACs 59, 60 are sigma-delta modulated; and the I and Q-channel low-pass filters 61, 62 are CT switched-capacitor filters which precisely control the baseband frequency by digital clocking.

The I and Q digital input signals 29I, 29Q are processed by the respective I and Q-channel interpolation filters 57, 58, DACs 59, 60 and low-pass filters 61, 62 to provide the analog input quadrature modulation components 25I, 25Q The transmitter section 12 includes an I-channel anti-alias low-pass filter 64, a Q-channel anti-alias low-pass filter 65, an I-channel baseband amplifier 66, a Q-channel baseband amplifier 67, an I-channel mixer 68, a Q-channel mixer 69, a 90-degree phase shifter 70, an adder 71, and a driver amplifier 72. Local oscillator signals at the transmit frequency TF are provided to each of the I-channel mixer 68 and the Q-channel mixer 69 by the synthesizer 16.

The analog input quadrature modulation components 25I, 25Q are respectively filtered by the I and Q-channel low-pass filters 64, 65, amplified by the I and Q-channel baseband amplifiers 66, 67, upconverted by the I and Q-channel mixers 68, 69 and combined by the adder 71 to provide an RF communication transmit signal 74, which is amplified by the driver amplifier 72 to provide the output transmit signal TX-OUT that drives the external power amplifier.

The benefits specifically stated herein do not necessarily apply to every conceivable embodiment of the present invention. Further, such stated benefits of the present invention are only examples and should not be construed as the only benefits of the present invention. While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. An RF ASIC for a subscriber communicator, comprising:
   a receiver section, including;
      means for receiving an RF communication signal; and
      means for downconverting and demodulating the received RF communication signal to provide analog quadrature components of the received signal at baseband;
   a transmitter section, including:
      means for upconverting and combining analog input quadrature modulation components to provide an RF communication transmit signal; and
      means for amplifying the transmit signal for driving an external power amplifier; and
   a CODEC for processing the analog baseband quadrature components of the received signal to provide I and Q digital output signals, and for processing I and Q digital input signals to provide the analog input quadrature modulation components for said upconversion, the codec including an analog to digital converter and a decimation filter arranged to receive signals from the analog to digital converter for processing received signals, the codec also including an interpolator and a digital to analog converter arranged to receive signals from the interpolator for processing signals to be transmitted.

2. An RF ASIC according to claim 1, further comprising:
   a signal port for combining the I and Q digital output signals for output as a serial digital signal stream, and for separating the I and Q digital input signals from an input serial digital signal stream.

3. An RF ASIC according to claim 1, wherein the receiver section includes superheterodyne means for downconverting the received signal.

4. An RF ASIC according to claim 3, wherein within the superheterodyne means, an output of a first downconverting section at an intermediate frequency is provided to a first port and an input from a second port is provided to a second downconverting section for downconversion from the intermediate frequency.

5. An RF ASIC according to claim 1, further comprising:
   low-pass filtering means between the receiver section and the CODEC.

6. An RF ASIC according to claim 5, further comprising:
   low-pass filtering means between the CODEC and the transmitter section.

7. An RF ASIC according to claim 1, further comprising:
   low-pass filtering means between CODEC and the transmitter section.

8. An RF ASIC according to claim 1, further comprising:
   a synthesizer for providing signals at selected frequencies for use in said downconversion and upconversion.

9. An RF ASIC according to claim 1, wherein the receiving means include a low-noise amplifier.

10. An RF ASIC for a subscriber communicator for use in satellite communications, comprising:
    a receiver channel including:
       means for downconverting and demodulating a received RF satellite communication signal to provide received quadrature components at baseband; and
       means for processing the quadrature components of the received signal to respectively provide I and Q digital output signals the processing means including a codec having an analog to digital converter and a decimation filter arranged to receive signals from the analog to digital converter for processing received signals; and
    a transmitter channel, including:
       means for processing I and Q digital input signals to provide input quadrature modulation components the processing means including a codec having an interpolator and a digital to analog converter arranged to receive signals from the interpolator for processing signals to be transmitted; and
       means for upconverting and combining the input quadrature modulation components to provide an RF communication transmit signal.

11. An RF ASIC according to claim 10, further comprising:
    a single port for combining the I and Q digital output signals for output as a serial digital signal stream, and for separating the I and Q digital input signals from an input serial digital signal stream.

12. An RF ASIC according to claim 10, further comprising:
    a port for combining the I and Q digital output signals for output as a serial digital signal stream.

13. An RF ASIC according to claim 10, further comprising:
    a port for separating the I and Q digital input signals from an input serial digital signal stream.

14. An RF ASIC according to claim 10, wherein the receiver channel includes superheterodyne means for downconverting the received signal.

15. An RF ASIC according to claim 14, wherein within the superheterodyne means, an output of a first downconverting section at an intermediate frequency is provided to a first port and an input from a second port is provided to a second downconverting section for downconversion from the intermediate frequency.

16. An RF ASIC according to claim 10, wherein the receiver channel includes:
    low-pass filtering means between the downconverting and demodulating means and the processing means.

17. An RF ASIC according to claim 16, wherein the transmitter channel includes:
    low-pass filtering means between the processing means and the upconverting and combining means.

18. An RF ASIC according to claim 10, wherein the transmitter channel includes:
    low-pass filtering means between the processing means and the upconverting and combining means.

19. An RF ASIC according to claim 10, further comprising:
    means for synthesizing signals at selected frequencies for use in said downconversion and upconversion.

20. An RF ASIC according to claim 10, wherein the receiver section includes:
    means for low-noise amplifying of the received signal prior to said downconversion.

21. An RF ASIC comprising:
    a receiver constructed and arranged to receive an input signal;
    a receiver codec for decoding quadrature signals from the receiver;
    a transmitter codec for coding quadrature signals to be tranmitted;
    a transmitter constructed and arranged to receive signals from the transmitter codec and transmit them;

an I²S port constructed and arranged to receive signals from the receiver codec and provide signals to the transmitter codec;

a synthesizer constructed and arranged to synthesize integration signals required to integrate the ASIC with a digital signal processor; and an SPI Port coupled to the synthesizer for programming the synthesizer to synthesize the integration signals.

22. An RF ASIC according to claim 21 further including:

a digital signal processor coupled to the I²S port for receiving an output serial digital signal stream of received signals from the I²S port and providing an input serial digital signal stream of signals to be transmitted to the I²S port.

* * * * *